3,253,050
PROCESS FOR THE PRODUCTION OF ALKYLATED BENZENE HYDROCARBONS

Wulf Schwerdtel and Walter Krönig, Leverkusen, Germany, assignors to Farbenfabriken Bayer Aktiengesellschaft, Leverkusen, Germany, a corporation of Germany
No Drawing. Filed Dec. 4, 1962, Ser. No. 242,060
Claims priority, application Germany, Dec. 6, 1961, F 35,477
6 Claims. (Cl. 260—671)

This invention relates to a process for the production of alkylated benzene hydrocarbons and to catalysts used in such a process.

It is known to alkylate benzene hydrocarbons using catalysts which contain free phosphoric acid. When using these catalysts in a fixed position it is necessary for small quantities of water to be added to the hydrocarbons to be treated in order to maintain the activity of the catalyst at a sufficient level. Accordingly, when carrying out this process, it is necessary to take special steps to avoid affecting the fixing of the catalysts. For example, the water may be supplied to different parts of the reaction space. The phosphoric acid may also be flushed off the catalyst by the water-containing reaction product by this process, the acid entering the reaction product.

It is an object of the invention to avoid the above mentioned disadvantages. A further object is to provide new catalysts for the alkylation process. Still further objects will appear hereinafter.

It has now been found that these objects can be attained in accordance with the present invention by using, as catalyst for the alkylation of benzene hydrocarbons, primary aluminium phosphate aluminium dihydrogen phosphate of the formula $Al(H_2PO_4)_3$ on neutral or acid supports.

The primary aluminium phosphate can be prepared for example by first preparing the neutral (tertiary aluminium phosphate and then reacting this with the phosphoric acid to yield the primary phosphate. For the production of the tertiary phosphate, it is possible for example to start from water-soluble aluminium compounds (such as, for example, aluminium sulfate or aluminium nitrate) and to react these compounds with phosphoric acid or water-soluble phosphates (such as ammonium phosphate) in aqueous solution to form the tertiary aluminium phosphate. The aluminium phosphate precipitated from the solution is preferably washed to remove adhering salts and is then reacted with phosphoric acid to form the water-soluble primary aluminium phosphate.

Aluminium hydroxide may also be used as starting material however, and this may be introduced into an aqueous phosphoric acid solution, in which it is converted via the tertiary aluminium phosphate to the primary aluminium phosphate. The isolation of the tertiary aluminium phosphate is unnecessary in this case. The solution which is obtained can be used directly or also after dilution with water for impregnating the supports. If desired, the primary phosphate may be precipitated from the aqueous solution, for example by adding acetone.

The primary aluminium phosphate can be used in equeous solution for impregnating neutral or acid supports. Examples of suitable neutral supports are aluminium phosphate, boron phosphate, silicon carbide and other supports. Acid supports which may be mentioned include silicic acid and silicates. Especially suitable silicates are natural silicates of the Montmorillonite type, such silicates activated with acid, and also the so-called synthetic cracking catalysts, in particular aluminium and magnesium silicates. The quantity of primary aluminium phosphate on these supports can amount to about 2–30% by weight, for example, advantageously about 5–15% by weight. The catalyst so prepared is then dried and heated for example to about 400–500° C. in order to produce a body of sufficient strength.

The catalysts are preferably used in solid form in the reaction chamber. For example, pills or spherical elements with a size of 2–10 mm., preferably 3–6 mm., are suitable.

Natural or synthetic cracking catalysts already have an inherent catalytic effect on the alkylation of benzene hydrocarbons. Supported primary aluminium phosphate has, however, a greater alkylation activity which in addition falls more slowly.

If the capacity of the primary aluminium phosphate catalyst is not fully satisfactory after being in operation for several weeks it can be regenerated to full activity in a simple manner by roasting thoroughly in air at temperatures between 400–600° C.

The primary aluminium phosphate catalysts used according to the invention do not require any addition of water during alkylation and addition of water does not produce any appreciable increase in the activity. Due to water not being present, there is also no danger of the primary aluminium phosphate being washed out of the support and the reaction products are free from phosphoric acid or phosphates. Temperatures between about 200 and 300° C. and advantageously between 240 and 280° C. are used for the alkylation of benzene hydrocarbon. The pressure can be chosen that a substantial part of the benzene hydrocarbons is liquid under the reaction conditions. Pressures between 20 and 100 atm. and advantageously 30 to 70 atm. are for example suitable. The throughputs of the reactants through the reaction chamber can for example be so chosen that 0.3 to 2 kg., preferably 0.6 to 1.2 kg., of alkylation product are formed per hour per litre of reaction space. The alkylation agent, for example ethylene, propylene, butylenes, can be supplied at the entrance of the reaction chamber. However, it is more advantageous in certain cases to introduce the alkylation agent at different places in the reaction chamber, for example at 3, 4, or 5 different places in the reaction chamber, which are at substantially the same distance from one another. The reaction products preferably flow downwards over the fixed catalyst. Total reactor lengths of 1 to 12 m., advantageously 2 to 8 m., are for example suitable. If desired, the total reaction length may be made up of a number of different reactors connected in series. It is generally advantageous for the catalyst bed to be considerably split up, for example among a relatively large number of reactor tubes, which are enclosed by a cooling liquid, advantageously a boiling cooling liquid, for example water. In this way, the heat of reaction can be reliably and usefully removed. The reaction tubes can, for example, have a diameter of 25 to 75 mm. and the reactants are distributed uniformly among the separate tubes. The products leaving the reaction chamber are cooled in a heat exchanger and pass into a collecting vessel in which a liquid level is maintained. The reaction products are extracted from the liquid part, and these products are then split up by distillation into their components. The residual gases can be expanded from the gas chamber, provided they are not dissolved in the reaction product.

It is advantageous for some of the reaction product to be returned into the reactor. It is obvious that a more uniform distribution of the olefines in the contents of the reactor is caused by this return and in addition the setting up of locally higher temperatures is counteracted. The reaction product is preferably returned into the reactor inlet before being cooled. The quantity of the product returned can for example be between 30 and 300% of the fresh total charge.

Benzene hydrocarbons which can be used for the alkylation include for example benzene and its homologues, such as toluene and xylenes as well as other benzene hydrocarbons. Suitable alkylation agents include those compounds usually employed for this reaction, such as gaseous olefines, in particular ethylene, propylene and butylenes. The olefines can be used in concentrated form but they can also be employed in admixture with paraffins. It has proved to be advisable to introduce into the reaction about 20 to 120 mols, and advantageously 40 to 100 mols of the olefine to 100 mols of the benzene hydrocarbon to be alkylated. In general, the olefine is almost completely reacted in the alkylation in passing through the reaction chamber, so that a practically olefine-free residual gas is formed.

The catalysts described have a good activity for the alkylation of the benzene hydrocarbons. However, they are only able to catalyze realkylation of the alkyl compounds to a minor degree. If the alkyl compounds are not produced in the reaction product in the proportions in which they are desired, it is advantageous for the reaction product to be sent through a reaction tube immediately following the alkylation reactor in which a catalyst which is able to produce realkylation is located. Examples of such catalysts include those containing tungstic acid.

The separation of the crude alkylate obtained according to the invention can be effected by distillation. The unreacted benzene hydrocarbons which are recovered can be used again for the alkylation. Similarly, more highly alkylated benzene hydrocarbons can for the major part be converted by realkylation into cumene by introduction before the last reactor.

*Example 1*

(a) A mixture of 350 g. of phosphoric acid (85%) and 208 g. of water was heated to 50° C. 78 g. of freshly precipitated aluminium hydroxide (based on dry substance) were introduced into this solution. The temperature should be 70 to 80° C. Stirring was carried out for one hour. A precipitate of tertiary aluminium phosphate which is initially formed in certain circumstances quickly dissolves again. This basic solution was diluted with water in the ratio 1:2 and used to impregnate a synthetic aluminium silicate cracking catalyst as support in the usual way, about 10% primary aluminum phosphate being applied (based on the dry substance) to the support. The impregnated catalyst support (4 mm. balls) was dried and heated for three hours at 450° C. After cooling, 250 ml. of catalyst was introduced into each of a series of three reaction tubes. The tubes had a diameter of 30 mm. and a catalyst chamber length of 400 to 500 mm. A reaction temperature of 260° C. and a pressure of 60 atm. were used. 1.670 g. of benzene and a total 320 g. of a stream of propylene containing 94% of propylene, the remainder being substantially propane, were introduced per hour. The stream of propylene was distributed uniformly to the three reaction tubes and the reactants flowed downwardly through said tubes. Beyond the reaction tubes, the reaction products were cooled to room temperature and collected in a separator from which they were expanded. More than 99.9% of the propylene introduced had reacted. The liquid reaction product had the following composition:

| | Percent by weight |
|---|---|
| Non-aromatics | 0.7 |
| Benzene | 56.6 |
| Isopropyl benzene | 27.3 |
| Diisopropyl benzene | 11.2 |
| Triisopropyl benzene | 3.0 |
| Tetraisopropyl benzene | 0.9 |
| Higher hydrocarbons | 0.3 |
| | 100.0 |

(b) The procedure described in Example 1(a) was followed, but the reaction product was conducted through an additional reactor which was kept at 300° C. before cooling. The reactor contained 250 cc. of a catalyst which was obtained by mixing and grinding 4 mols of tungstic acid, 0.5 mol of tin dioxide and 1 mol of phosphoric acid the mixture being heated to 500° C. after mixing and grinding. Before entering this reaction chamber, 2 g. of n-isopropanol were added to the reaction stream, the said isopropanol being decomposed in the reaction chamber into propylene and water. In this case also, transfer occurred in the downward flow; due to the transfer, a realkylation took place and the liquid reaction product now had the following composition:

| | Percent by weight |
|---|---|
| Non-aromatics | 0.1 |
| Benzene | 51.8 |
| Isopropyl benzene | 40.0 |
| Diisopropyl benzene | 7.7 |
| Triisopropyl benzene | 0.4 |
| Tetraisopropyl benzene | 0 |
| Higher hydrocarbons | 0 |
| | 100.0 |

*Example 2*

Into a 700 cc. autoclave with stirrer there are introduced 20 g. of the catalyst used in Example 1(a) and 240 cc. of benzene. Subsequently, ethylene was introduced at a pressure of 60 atm., the amount of benzene and ethylene corresponding to a mole ratio of 1:1. The mixture was then heated to 280° C., whereby the pressure rose at first to about 300 atm. and subsequently dropped to about 118 atm. due to the reaction of ethylene with benzene. The reaction was carried out for two hours. Then the pressure was relieved and the reaction products were worked up. 270 g. of liquid products were obtained having the following composition:

| | Percent by weight |
|---|---|
| Ethylene (dissolved) | 0.9 |
| Benzene | 56.7 |
| Ethyl benzene | 25.4 |
| Diethyl benzene | 11.8 |
| Higher alkylated benzenes | 5.2 |
| | 100.0 |

This yield corresponds to an ethylene conversion of about 50%.

*Example 3*

Into a 700 cc. autoclave with stirrer there are introduced 20 g. of the catalyst used in Example 1(a) and 240 cc. of benzene. Subsequently, there are added 60 g. of a C₄-hydrocarbon cut consisting of 80 parts by weight of n-butenes and 20 parts by weight of butanes. This corresponds to a mole ratio of butenes to benzene of 1:3. The autoclave was then heated for two hours at 280° C. After the pressure was relieved, the reaction products were worked up. There were obtained 275 g. of liquid reaction products of the following composition:

| | Percent by weight |
|---|---|
| $C_4$-hydrocarbons (dissolved) | 6.4 |
| Benzene | 73.4 |
| Unknown reaction products | 0.8 |
| Butyl benzenes | 18.9 |
| Higher alkylation products | 0.5 |
| | 100.0 |

This yield corresponds to a butene conversion of about 70%.

*Example 4*

Into a 700 cc. autoclave with stirrer there are introduced 20 g. of the catalyst used in Example 1(a) and 260 g. of ethyl benzene. Thereafter, ethylene was introduced until a pressure of 60 atm. was reached corresponding to a mole ratio of ethylene to ethyl benzene of 1:1. The autoclave was heated for two hours to 280° C., and the reaction products were worked up. There were obtained 290 g. of liquid reaction products of the following composition:

| | Percent by weight |
|---|---|
| Ethylene (dissolved) | 0.7 |
| Ethyl benzene | 76.1 |
| Unknown hydrocarbons | 1.7 |
| Diethyl benzene | 15.5 |
| Higher alkylated products | 6.0 |
| | 100.0 |

This yield corresponds to an ethylene conversion of about 50%.

*Example 5*

Into a 700 cc. autoclave with stirrer there were introduced 20 g. of the catalyst used in Example 1(a) and 260 g. of ethyl benzene. Thereafter, there were added 60 g. of the $C_4$-hydrocarbon cut used in Example 3. The reaction mixture contains butenes and ethyl benzene in a mole ratio of 1:3. The autoclave was heated for two hours to 280° C., and the reaction product was worked up. There were obtained 295 g. of liquid products having the following composition:

| | Percent by weight |
|---|---|
| $C_4$-hydrocarbons (dissolved) | 6.3 |
| Ethyl benzene | 64.3 |
| Unknown hydrocarbons | 2.9 |
| Ethyl/butyl benzenes | 26.5 |
| | 100.0 |

This yield corresponds to a butene conversion of about 70%.

We claim:

1. In the process for the alkylation of a member selected from the group consisting of benzene and lower alkyl-substituted benzene by reacting the same with a lower olefin as alkylating agent in the presence of a catalyst at an elevated temperature and pressure, the improvement of effecting said reaction at a temperature of from 200 to 320° C. and a pressure of 120 to 100 atmospheres in the presence of a supported catalyst comprising a primary aluminum phosphate $Al(H_2PO_4)_3$ supported upon a member selected from the group consisting of neutral and acid supports.

2. Improvement according to claim 1, which comprises utilizing as support for said primary aluminum phosphate a member selected from the group consisting of aluminum phosphate ($AlPO_4$), boron phosphate, silicon carbide, silicic acid, and acid silicates.

3. Improvement according to claim 1, which comprises effecting said reaction in the absence of water.

4. Improvement according to claim 1, which comprises effecting said reaction by introducing said lower olefin alkylating agent at different points of the reaction zone.

5. Improvement according to claim 1, which comprises effecting said reaction by passing a mixture of said benzene group member and lower olefin downwardly through a reaction zone in which said catalyst is fixedly maintained.

6. Improvement according to claim 1, which comprises withdrawing the reaction product thus obtained and passing the same in contact with a catalyst containing tungstic acid.

References Cited by the Examiner

FOREIGN PATENTS 697,013  9/1953  Great Britain.

OTHER REFERENCES

Shreve: Industrial & Engineering Chemistry, col. 45, No. 9, September 1953, p. 1904.

DELBERT E. GANTZ, *Primary Examiner.*

ALPHONSO D. SULLIVAN, *Examiner.*

J. E. DEMPSEY, *Assistant Examiner.*